J. L. BROSCHART.
PIPE COUPLING.
APPLICATION FILED MAR. 8, 1918.
1,281,905. Patented Oct. 15, 1918.
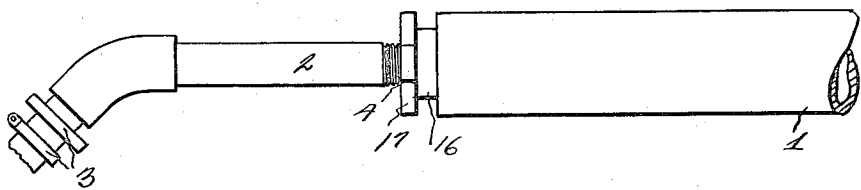
Fig. 1.
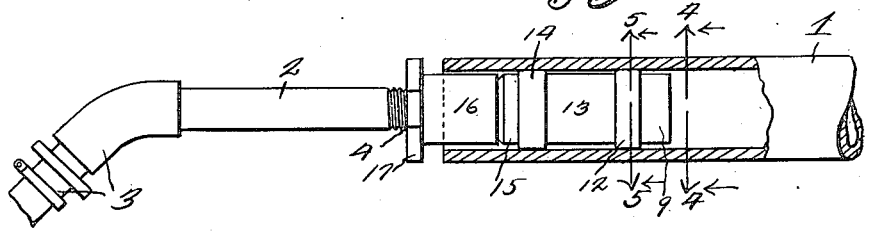
Fig. 2.
Fig. 3.
Fig. 5. Fig. 4.
Inventor
J. L. Broschart
Witnesses

UNITED STATES PATENT OFFICE.

JACOB L. BROSCHART, OF TRENTON, MISSOURI.

PIPE-COUPLING.

1,281,905.

Specification of Letters Patent. Patented Oct. 15, 1918.

Application filed March 8, 1918. Serial No. 221,163.

*To all whom it may concern:*

Be it known that I, JACOB L. BROSCHART, a citizen of the United States, residing at Trenton, in the county of Grundy, State of Missouri, have invented a new and useful Pipe-Coupling; and I do hereby declare the following to be a full, clear, and exact description of the invention, such as will enable others skilled in the art to which it appertains to make and use the same.

This invention relates to an improved pipe coupling, and an object of the invention is to provide a tight coupling for air, steam and water pipes, and one which is particularly adapted for train line pipes.

A further object of the invention is to provide a coupling which may be easily and quickly repaired by trainmen or other mechanics when sent out on the road.

A further object of the invention is to provide a pipe coupling, comprising means interposed between the adjacent telescopical ends, adapted to be forced frictionally in contact with said pipe sections, in order to insure a firm and secure coupling between the pipe sections.

A further object of the invention is the provision of expansive means between the pipe sections, and means for expanding said expansive means, to insure a tight joint between the pipe sections.

In practical fields the details of construction may necessitate alterations falling within the scope of what is claimed.

The invention comprises further features and combination of parts as hereinafter set forth shown in the drawings and claimed.

In the drawings:—

Figure 1 is a view in side elevation showing the adjacent ends of two pipe sections joined by means of the improved coupling.

Fig. 2 is a view showing one of the sections of the pipe or train line in elevation, and the other partly in section, showing the coupling means applied.

Fig. 3 is a longitudinal sectional view through the joined pipe sections, showing the coupling means in section, and parts of the pipes in elevation.

Fig. 4 is a sectional view on line 4—4 of Fig. 2.

Fig. 5 is a cross sectional view on line 5—5 of Fig. 2.

Referring more especially to the drawings 1 designates one of the pipe sections, and 2 the other pipe section, which is provided with conventional means 3 for connection to the usual train line hose or pipe.

The pipe section 2 extends into the pipe section 1 and is provided with threads 4. The exterior threaded surface at the end of the pipe section 2 is provided with a longitudinally extending groove 5 for the reception of a wire member 6, which is provided with an angle end 7. The marginal edge of the end of the pipe section 2 has a notch 8 for the reception of the lateral end 7 of the wire member. A collar 9 is threaded on the end of the pipe section 2, and is provided with a radial groove 10 on one face, for the reception of the bent end 11 of said collar 9. By virtue of the groove 5, the notch 8 and the groove 10, and the angular wire member, the collar 9 is prevented from unscrewing from the pipe section 2. Fitting over the threaded portion of the pipe section 2 is a rubber gasket 12, which is adjacent the collar 9. A sleeve 13 telescopically fits over the threaded portion of the pipe section 2, between the gasket or washer 12 and the gasket or washer 14, which is also slipped over the threaded end of the pipe section 2. A collar 15 telescopically fits over the threaded end of the pipe section 2, and between this collar and the sleeve 13, the gasket 14 is interposed. A sleeve 16 is threaded on the threaded part of the pipe section 2 and this sleeve, and this sleeve, the collar 15, the gasket 14, the sleeve 13, the gasket 12 and the collar 9 extend into the pipe section 1, as shown clearly in Figs. 2 and 3. It is to be noted that the sleeve 16, the collar 15, the sleeve 13 and collar 9 are of less diameters than the inner cylindrical surface of the pipe section 1. The sleeve 16 has a nut shaped head 17, to be engaged by a wrench or the like, so that by setting up on the sleeve, and since the collar 9 is prevented from detaching, the gaskets 12 and 14 are expanded into firm and frictional contact with the inner surface of the pipe section 1, thereby securely and firmly coupling the two pipe sections, whereby an air, steam or water tight joint between the two sections is insured. It is to be noted that by this particular construction, a quick detachable coupling for pipe sections is provided, and one which may be quickly repaired, by backing off the sleeve 16, to allow the gaskets to contract, so that the pipe sections may be disconnected, and by removing the gaskets (which may be split if deemed desirable) by separating the split ends of the gaskets, or by straightening the bent end 7 of the wire member to permit the removal of the collar 9. This form of coupling can be applied to any pair of pipe sections, either those used in train line connections, or those used in other pipe equipments.

The invention having been set forth what is claimed as new and useful is:—

In a pipe coupling, the combination with a pair of pipe sections, one in surrounding telescopical spaced relation with respect to the other, the inner section received by the outer section and threaded throughout its inclosed length, of a collar detachably threaded and locked on the inner end of the inner section, an expansible packing on the part of the inner section adjacent said collar, a second expansible packing in surrounding relations to the inner section, a spacing sleeve on the inner section interposed between the two packings, a second collar in surrounding relation to the inner section and in contact with the second packing, and a sleeve having a nut portion threaded on the inner section and telescoping the outer section in contact with the second collar and being adjustable toward the first collar, whereby, upon such coöperation between the first collar and the second sleeve, said expansible packings are expanded toward and firmly into contact with the inner wall of the outer section.

In testimony whereof I have signed my name to this specification in the presence of two subscribing witnesses.

JACOB L. BROSCHART.

Witnesses:
  W. E. SIEBENBORN,
  JOS. BACHER.